(12) United States Patent
Bergh et al.

(10) Patent No.: US 8,001,616 B2
(45) Date of Patent: Aug. 16, 2011

(54) SYSTEM AND METHOD FOR PRESENTATION INTEGRITY

(75) Inventors: Peter L. Bergh, Colorado Springs, CO (US); Raymond L. Wagner, Elbert, CO (US)

(73) Assignee: The Boeing Company, Chicago, IL (US)

( * ) Notice: Subject to any disclaimer, the term of this patent is extended or adjusted under 35 U.S.C. 154(b) by 131 days.

(21) Appl. No.: 12/466,487

(22) Filed: May 15, 2009

(65) Prior Publication Data
US 2009/0228710 A1 Sep. 10, 2009

Related U.S. Application Data

(62) Division of application No. 10/605,349, filed on Sep. 24, 2003, now Pat. No. 7,552,334.

(51) Int. Cl.
*G06F 21/00* (2006.01)
(52) U.S. Cl. .............. 726/30; 726/26; 726/27; 713/165; 713/176; 713/193; 380/200; 380/201
(58) Field of Classification Search .................. None
See application file for complete search history.

(56) References Cited

U.S. PATENT DOCUMENTS

| | | | |
|---|---|---|---|
| 5,815,809 A | 9/1998 | Ward et al. | |
| 6,347,144 B1 | 2/2002 | Park | |
| 6,398,245 B1 * | 6/2002 | Gruse et al. | 280/228 |
| 6,438,235 B2 * | 8/2002 | Sims, III | 380/285 |
| 6,598,162 B1 | 7/2003 | Moskowitz | |
| 2002/0062445 A1 | 5/2002 | Owada et al. | |
| 2002/0099947 A1 | 7/2002 | Evans | |
| 2003/0229529 A1 | 12/2003 | Mui et al. | |
| 2004/0123109 A1 | 6/2004 | Choi | |
| 2004/0210762 A1 | 10/2004 | Kawamoto et al. | |
| 2004/0225891 A1 | 11/2004 | Kang et al. | |

FOREIGN PATENT DOCUMENTS
WO 03/052630 6/2003
* cited by examiner

*Primary Examiner* — Minh Dinh
*Assistant Examiner* — Venkat Perungavoor
(74) *Attorney, Agent, or Firm* — Charles L. Moore; Moore & Van Allen PLLC

(57) ABSTRACT

A system for presentation integrity may include an encrypter to encrypt formatting data associated with information content data. A formatter may be included to decrypt the encrypted formatting data and to format the information content data in a predetermined format based on the decrypted formatting data. A method for presentation integrity may include decrypting encrypted formatting data associated with information content data and formatting the associated information content data in the predetermined format based on the decrypted formatting data.

21 Claims, 8 Drawing Sheets

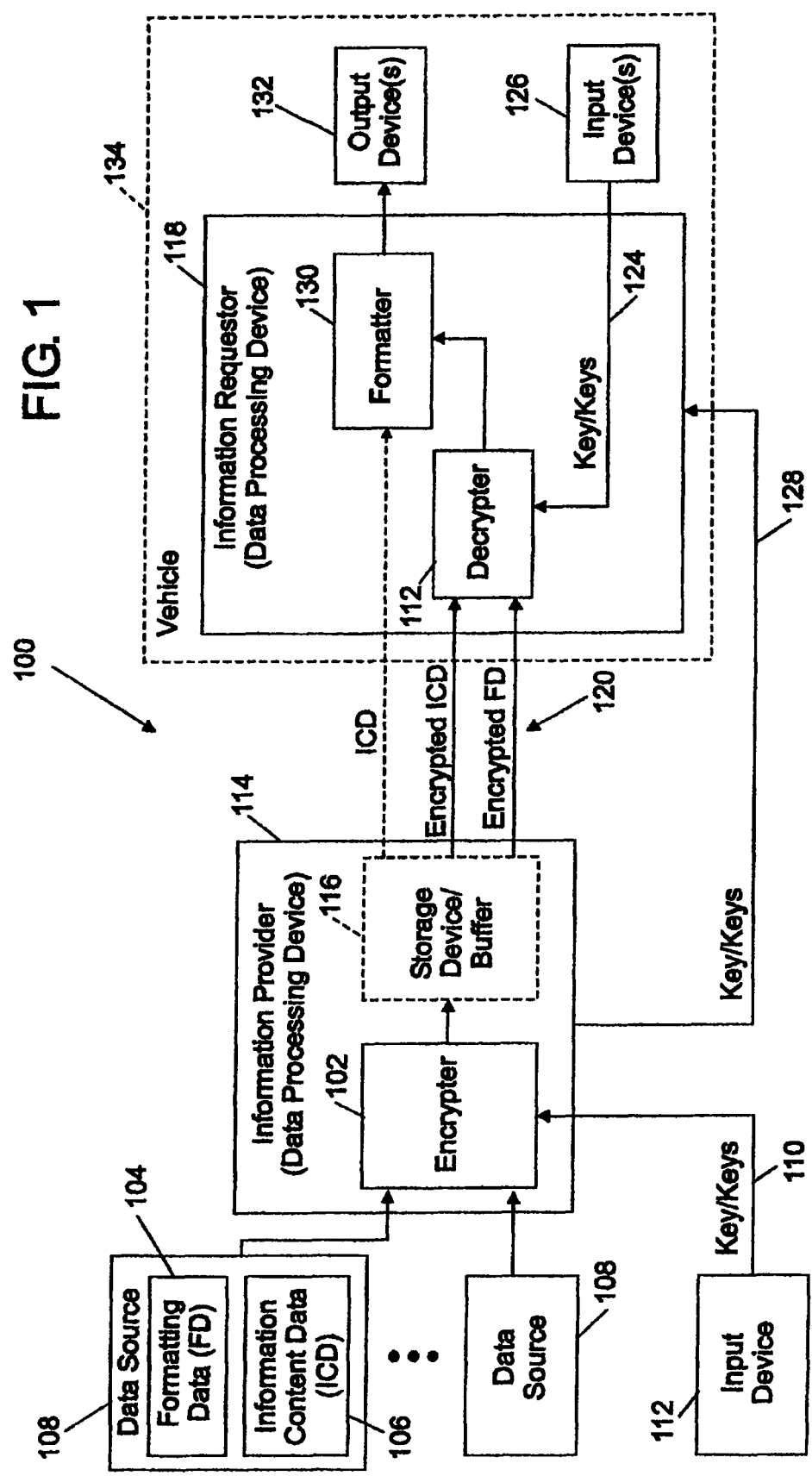

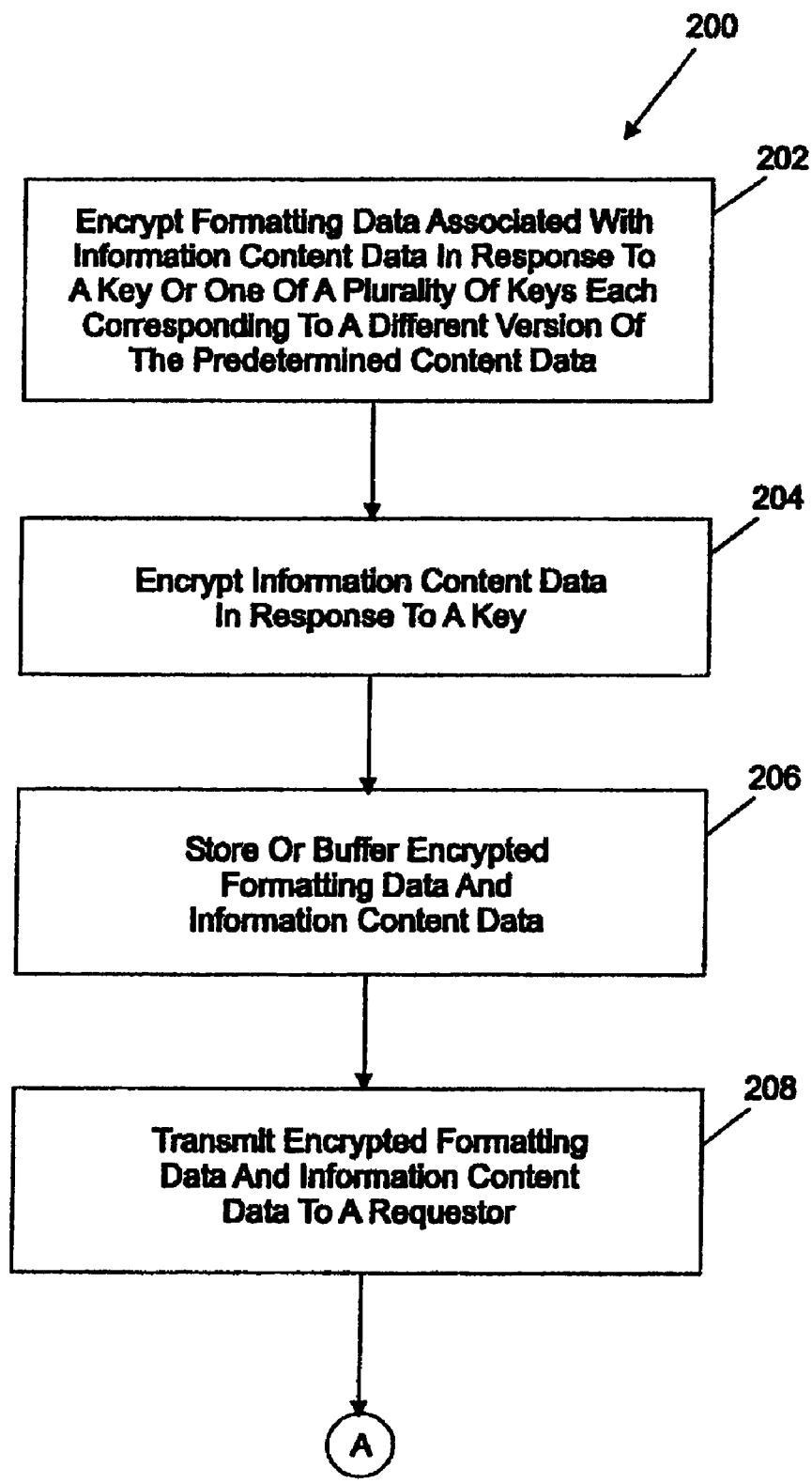

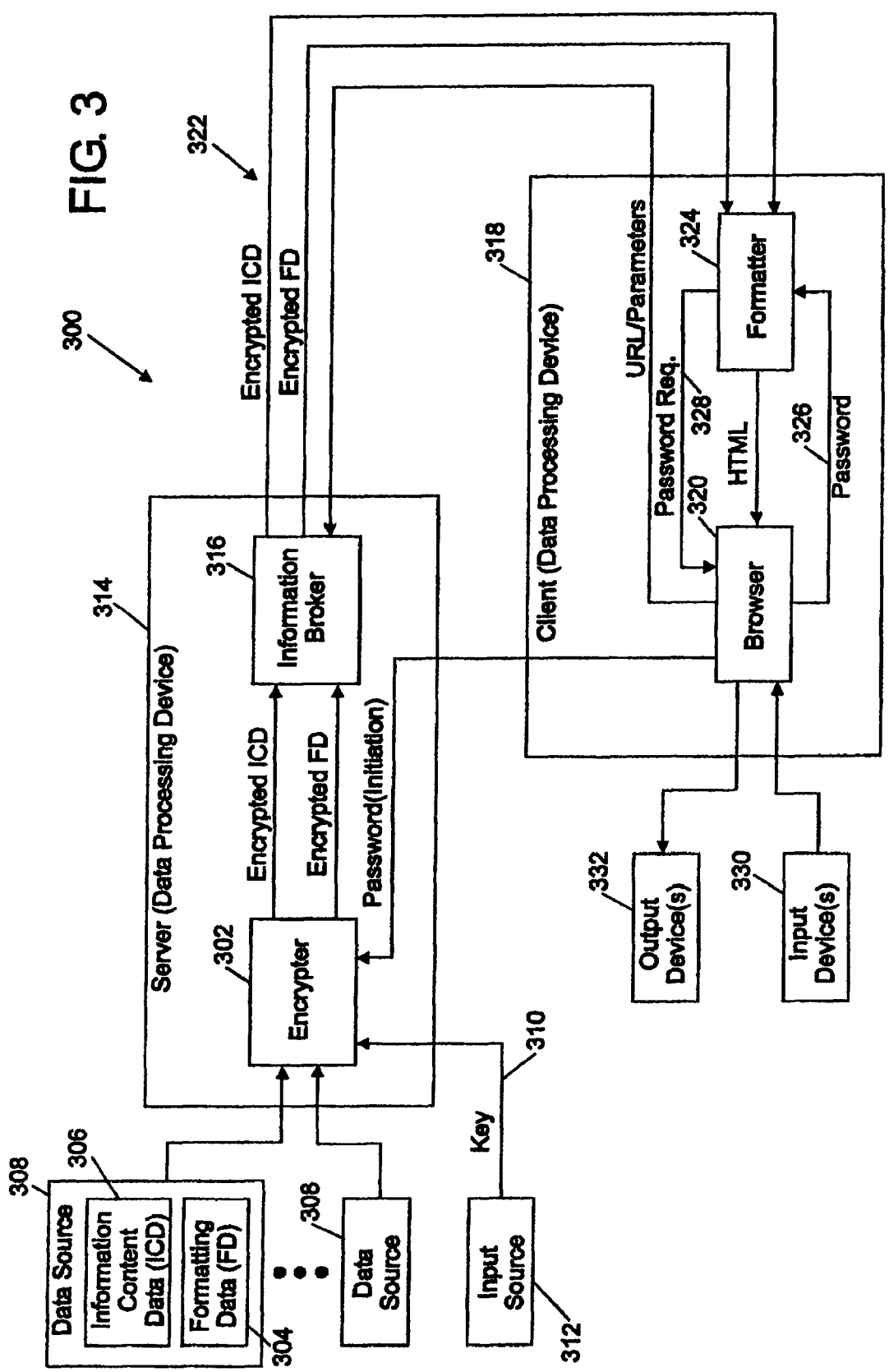

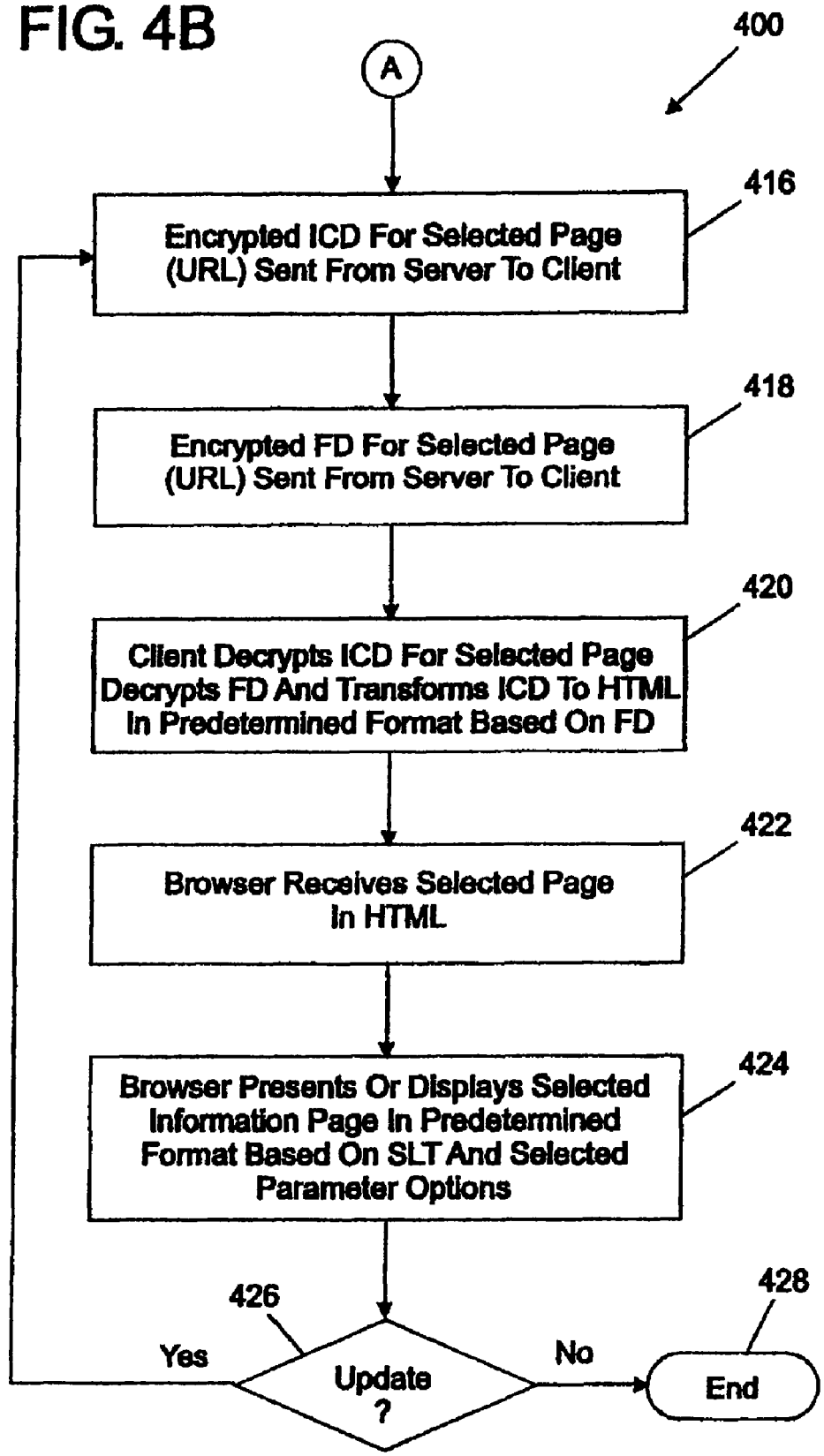

SYSTEM AND METHOD FOR PRESENTATION INTEGRITY

CROSS-REFERENCE TO RELATED APPLICATIONS

This application is a divisional of U.S. patent application Ser. No. 10/605,349 filed on Sep. 24, 2003, the disclosure of which is hereby incorporated by reference herein for all purposes.

FIELD OF THE INVENTION

The present invention relates to the presentation or display of information, and more particularly to a system and method for presentation integrity of information accessible by multiple users or requesters, for content control and for deterring unauthorized access or use.

BACKGROUND

There are often circumstances or situations when multiple requesters or users may access or view common information or data. If the information or data may be accessed or presented in different formats to the requesters or users, some of the requestors or users may infer different and possibly erroneous conclusions from the information or data as presented. This can lead to confusion, misunderstandings, delays in coordination and similar results that may cause a negative impact under some circumstances, such as situations where multiple agencies, organizations or entities have individual and either overlapping or noncontiguous responsibilities for planning, coordination and consequence management. Examples of such situations may include military operations, civil emergencies, wild fires, environmental crises, law enforcement and drug interdiction, business activities and the like. Accordingly, presentation integrity or presenting information in the same format or in a common format in some situations or under some circumstances may be desirable or important.

The common data or information may be accessed or transmitted electronically to multiple users or requesters, for example via networks, such as intranets or the Internet, or via other communication media or channels. With respect to the intranet or Internet paradigm, a user may access shared information via a web browser, such as Netscape® Microsoft® Internet Explorer or the like. Browser settings of the individual users may modify the display defaults of the information provider to present or display idiosyncratic versions of the information. Accordingly, the information presented on some users' displays may be different and even somewhat contradictory to the information presentation on displays of other users. As previously discussed, the presentation differences may cause confusion, misunderstanding, delays in coordination and other possible negative results. There may also be other influences that may affect the presentation of information between different users, such as insecure communication networks, media or channels that permit information to be tampered.

In addition to issues related to presentation integrity or presenting data or information in a common format or the same format between different users in some circumstances, there may be situations when presenting the information content in different formats to different users may be desirable. For example, some content or portions of materials or works, such as motion pictures, video games, music, software and the like, may be objectionable to some users and unsuitable for others, such as children. Such materials may be distributed or available on Compact Disk Read-Only Media (CDROM), Digital Video Disks (DVD) or via other communications media or channels, such as cable, satellite or downloadable via a network. One solution is to generate different versions for different audiences or markets. However, this involves creating, reproducing, distributing and selling each version on physically distinct media and diligent administration and control over access and distribution of the different versions. Such measures may not be practical or economical and may still be ineffective in controlling access under some circumstances and there is the burden of dealing with multiple versions.

Another issue with controlling access and use of information, especially proprietary and copyrighted information and materials, such as software, motion pictures, video games, music and the like, arises because much of these materials and information may be readily accessible via different media and can be easily reproduced without the owners or licensors authorization. This ready accessibility along with the proliferation of devices to copy or duplicate such materials has made controlling unauthorized copying, access and use difficult. Encryption may be used to protect such materials in transit to an authorized user or licensee and to prevent misappropriation or theft when stored on a system. However, once the materials are decrypted, they may be replicated and the unencrypted versions distributed without proof of the authorized user.

SUMMARY OF THE INVENTION

In accordance with an embodiment of the present invention, a system for presentation integrity may include an encrypter to encrypt formatting data associated with information content data. The system may further include a formatter to decrypt the encrypted formatting data and to format the information content data in a predetermined format based on the decrypted formatting data. Because the information content data is formatted in the predetermined format based on the decrypted formatting data, this embodiment of the present invention is useful to maintain presentation integrity of the information content data between multiple users or requesters.

In accordance with another embodiment of the present invention, a device to process data may include an encrypter to encrypt formatting data associated with information content data. The device may further include an information broker or the like to control access and to transmit the encrypted formatting data and the associated information content data to a requestor. This embodiment of the present invention is useful in that the information content data may be presented in the predetermined format to each requestor that can properly decrypt the encrypted formatting data for presentation integrity between the different requesters.

In accordance with another embodiment of the present invention, a device to process data may include a formatter to decrypt encrypted formatting data associated with information content data and to format the information content data into a predetermined format based on the decrypted formatting data. An output device may present the information content data in the predetermined format. This embodiment of the present invention is also useful in presenting the information content data in a predetermined format to each requester that can properly decrypt the encrypted formatting data for presentation integrity between the different requesters.

In accordance with another embodiment of the present invention, an electronically-readable medium includes thereon data structures that may include information content data and encrypted formatting data. The encrypted formatting data is applicable to the information content data to form the information content data in a predetermined format or a selected one of a plurality of predetermined formats. Accordingly, the information content data may be presented in the predetermined format for presentation integrity among different users or the information content may be presented in a selected one of a plurality of predetermined formats for content control for different intended users or audiences.

In accordance with another embodiment of the present invention, a method for presentation integrity may include decrypting encrypted formatting data associated with information content data. The associated information content data may be formatted in a predetermined format based on the decrypted formatting data. Accordingly, this embodiment of the present invention may be useful for presentation integrity among multiple users or requesters that can properly decrypt the encrypted formatting data to present the associated information content data in the predetermined format.

In accordance with another embodiment of the present invention, a method for presentation integrity may include accessing a chosen information page via a browser. Encrypted formatting data associated with the chosen information page may be decrypted. The chosen information page may be formatted in a predetermined format based on the formatting data and the chosen information page may be presented in the predetermined format. This embodiment of the present invention has the advantage of presenting a web page or information page in substantially the same predetermined format to each requestor or user that can properly decrypt the encrypted formatting data for presentation integrity among the different requesters or users.

In accordance with another embodiment of the present invention, a method to deter unauthorized access, copying or use may include encrypting each copy of a data structure to be embodied on an electronically-readable medium. A different key may be assigned to decrypt each copy of the data structure. In another embodiment, each copy of the data structure may be electronically identified or marked with a mark, label, indicator or the like identifying or corresponding to an authorized user. Each of these embodiments of the present invention may be useful in deterring unauthorized access, copying or use. An authorized user in possession of a particular copy and the proper decryption key may be determined by comparing the electronic mark, label or indicator corresponding to the authorized user to the identity of the actual user in possession of the particular copy and key.

BRIEF DESCRIPTION OF THE DRAWINGS

FIG. 1 is a block diagram of a system for presentation integrity in accordance with one advantageous embodiment of the present invention.

FIGS. 2A and 2B are a flow chart of a method for presentation integrity in accordance with another advantageous embodiment of the present invention.

FIG. 3 is a block diagram of a system for presentation integrity in accordance with another advantageous embodiment of the present invention.

FIGS. 4A and 4B are a flow chart of a method for presentation integrity of a page accessible via a browser in accordance with another advantageous embodiment of the present invention.

DETAILED DESCRIPTION OF THE INVENTION

Figure 2B:
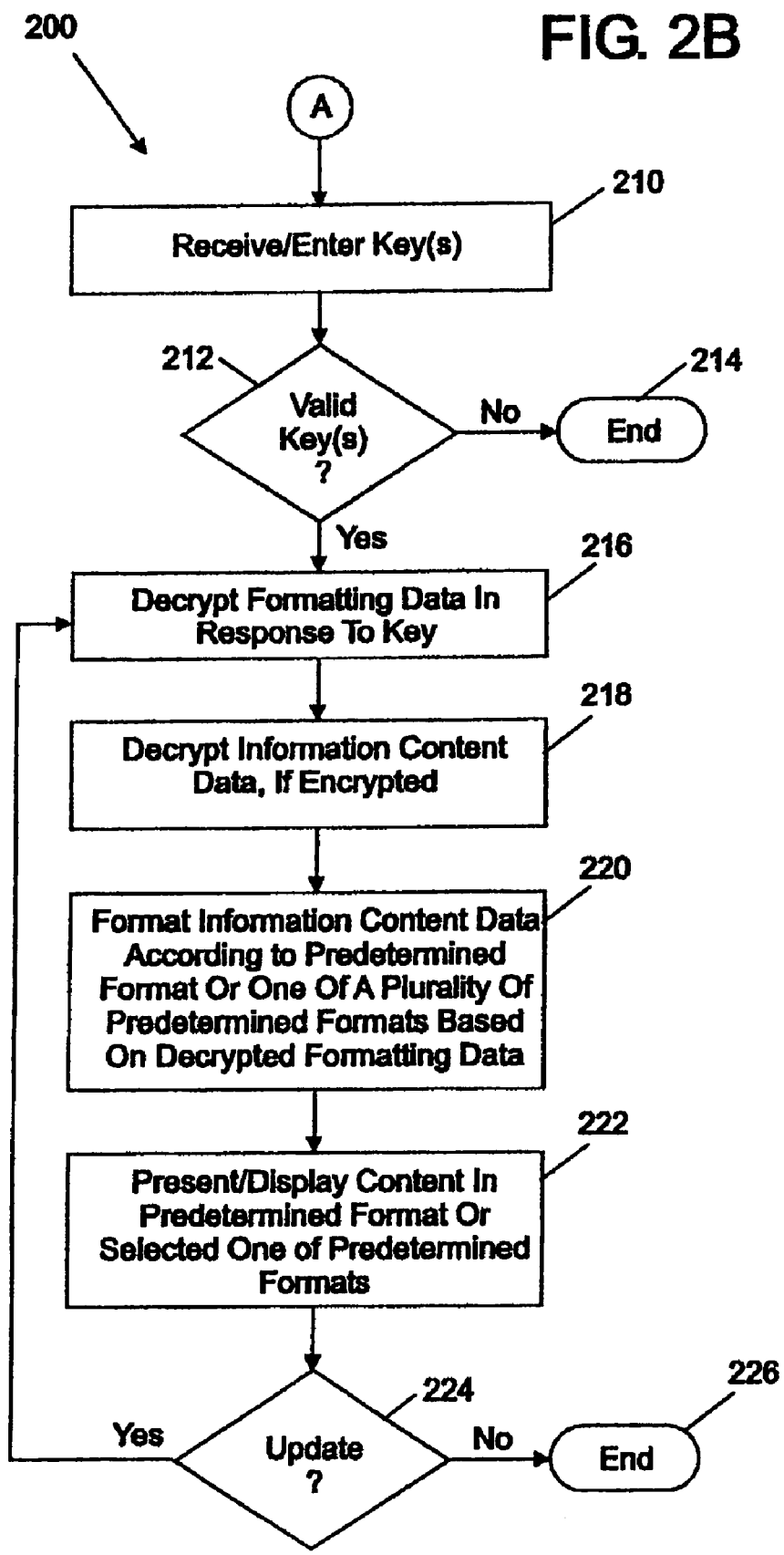

The following detailed description of preferred embodiments refers to the accompanying drawings which illustrate specific embodiments of the invention. Other embodiments having different structures and operations do not depart from the scope of the present invention.

FIG. 1 is a block diagram of a system 100 for presentation integrity in accordance with an embodiment of the present invention. The system 100 may include an encrypter 102 to encrypt metadata or formatting data (FD) 104 associated with information content data (ICD) 106. The encrypter 102 may also encrypt the information content data 106. Encryption, to encrypt or encryptable as used herein may include any type of scrambling, encoding or the like or the ability to do so by any known method or scheme to render a message, data, or signals unreadable except by an intended recipient who may have appropriate decryption means such as a decryption key or password. Decryption, to decrypt or decryptable as used herein may include any type of deciphering, decoding or the like or the ability to do so by any known method or scheme to render an encrypted message, data or signals readable by an intended recipient. The encrypter 102 may receive the information content data 106 and associated formatting data 104 from one or more data sources 108. The information content data 106 and associated formatting data 104 may each be encrypted in response to a key 110 or password that may be the same key or different keys. The key or keys 110 may be entered or applied to the encrypter 102 by an input device 112. The input device 112 may be a keyboard, optical, magnetic, infrared, voice recognition or radio frequency input device or the like. The encrypter 102 may operate or run on an information provider 114 that may be a server, data processing device or similar device. The encrypter 102 may be embodied in software, firmware, hardware or the like to perform encryption. The encrypter 102 may utilize symmetric (single-key) or asymmetric (two-key) algorithms or ciphers. Single-key or private-key encryption utilizes a single key to encrypt and decrypt the information. Two-key or public-key encryption utilizes one key to encrypt and a different key to decrypt. Examples of data encryption algorithms include Data Encryption Standard (DES), Advance Encryption Standard (AES), CAST-128 and CAST-256, International Data Encryption Algorithm (IDEA), Skipjack, an algorithm that uses a Clipper chip, Secure and Fast Encryption Routine (SAFER) and the like.

In one embodiment of the present invention, a storage device or buffer 116 may receive and store or buffer the information content data (encrypted or unencrypted) 106 and associated encrypted formatting data 104 prior to transmission to one or more information requesters 118. The information content data 106 and associated encrypted formatting data 104 may be transmitted to one more requesters 118 via a communication medium illustrated generally by arrow 120. The communication medium 120 may be a network, such as the Internet, private network or the like. The communication medium 120 may include one or more terrestrial communication channels or links and one or more aerospace communication channels or links. In other embodiments, the communication medium 120 may be any communication system including by way of example, dedicated communication lines, telephone networks, wireless data transmission systems, two-way cable systems, customized computer networks, interactive kiosk networks and the like.

The information requestor 118 may be a data processing device, client server or the like. The information requestor 118 may include a decrypter 122 to decrypt the information content data 106, if encrypted, and the encrypted formatting data 104. The decrypter 122 may be embodied in software, firmware or hardware. The decrypter 122 may be similar to the encrypter 102 and utilize a similar algorithm except to perform a reverse operation. The information content data 106 and associated formatting data 104 may be decrypted in response to a key or keys 124 that may be the same key or keys to encrypt the information content data and associated formatting data 104 or may be different keys for each. The key or keys 124 may be entered or applied to the decrypter 122 by an input device 126. The input device 126 may be similar to input device 112. The key or keys 124 may be received by the information requestor 118 via a separate communication channel 128 from the information provider 114. The separate communication channel 128 may involve transferring the key or keys 124 via a trusted third party or Certificate Authority (not shown is the drawings).

The information requestor 118 may include a formatter 130 to receive the decrypted information content data 106 and associated formatting data 104 from the decrypter 122 and to format the information content data 106 in a predetermined format based on the decrypted formatting data 104. The formatter 130 may receive the information content data 106 directly from the information provider 114, if unencrypted. The formatter 130 may be embodied in software, firmware or hardware to apply decrypted formatting data to associated information content data to present the information content data in a predetermined format or in a selected one of a plurality of predetermined formats. The decrypter 122 may be incorporated in the formatter 130 wherein the formatter 130 would perform the decryption function as well as formatting the information data content 106 in the predetermined format based on the decrypted formatting data 104. At least one output device 132 may be coupled to the formatter 130 to present the information content data 106 in the predetermined format. The output device 132 or devices may include a display, speaker or sound system, printer or the like.

Only a single information requestor 118 is shown in FIG. 1 for purposes of explanation. However, the system 100 may include a plurality of information requesters 118 each including a decrypter 122 and formatter 130 or including a formatter 130 that also incorporates the decrypter 122. Accordingly, each of the plurality of formatters 130 may decrypt the encrypted formatting data 104 and the information content data 106, if encrypted. The formatter 130 may then apply the decrypted formatting data 104 to the information content data 106 to format the information content data 106 in the predetermined format at each information requestor 118. By encrypting the formatting data or metadata and decrypting the formatting data in response to a valid key or password, the associated information content data 106 may be prevented from being formatted other than in the predetermined format at each information requestor 118 or client. Accordingly, each user or requester may have the information presented or displayed in the same format to prevent confusion, misunderstanding, delays in coordination or other adverse affects.

In an embodiment of the present invention, the information requester 118 or formatter 130 may be adapted to be included or embodied in a vehicle 134, such as an aerospace vehicle, watercraft or terrestrial vehicle. Accordingly, each vehicle 134 including an information requestor 118 or formatter 130 may be presented the information content 106 in the same predetermined format as other requesters 118 or formatters 130 not associated with a vehicle or the like.

FIGS. 2A and 2B are a flow chart of a method 200 for presentation integrity in accordance with an embodiment of the present invention. In block 202, formatting data or metadata associated with information content data may be encrypted in response to a key. In another embodiment of the present invention, the formatting data or different versions of the formatting data may each be encrypted by one of a plurality of different keys. Each one of the plurality of keys may be associated with a different version or predetermined format of the information content data when the decrypted formatting data is applied to format the information content data. The information content data may also be encrypted in block 204. The information content data may be encrypted by a different key or the same key used to encrypt the formatting data. In block 206, the encrypted formatting data and information content data may be stored or buffered before transmitting the encrypted formatting data and associated information content data to a requestor or client in block 208. Alternatively, the encrypted formatting data and information content data may be sent to the requester or client without storing or buffering. This may be desirable when real-time updates of the information are being provided to the requester or requesters.

In block 210 a key or keys may be received or entered by a requestor or user. In decision block 212, a determination may be made if the key or keys are valid. If the keys are invalid, the method may end at termination 214. If the key or keys are valid in block 212, the formatting data may be decrypted in block 216 in response to a key associated with the formatting data. The formatting data may provide or present the information content data in a predetermined format or in a selected one of a plurality of predetermined formats, each corresponding to a different key. The formatting data may be decrypted by the same key used to encrypt the formatting data or a different key. The information content data, if encrypted, may be decrypted in block 218. The information content data may be decrypted by a different key or the same key used to encrypt the information content data or the same or different keys used to encrypt and decrypt the formatting data.

In block 220, the information content data may be formatted according to a predetermined format based on the decrypted formatting data. In another embodiment of the present invention, the information content data is formable or may be formatted into one of a plurality of predetermined formats. Each of the predetermined formats may be associated with a different key to decrypt the formatting data. The formatting data may be decrypted to format the information content data in a selected one of the predetermined formats in response to a key associated with the selected predetermined format. Each of the predetermined formats may correspond to a different version of the information content data for different audiences. The information content data may form one of an audio, visual or combination audio-visual work, such as a motion picture, video game, music, software or the like. Accordingly, the content may be controlled by entering the appropriate key to select the format or version of the audio, visual or combination audio-visual work with any possibly objectionable portions deleted or more appropriate portions substituted for the intended audience. The material or work may then be distributed in one form or medium and the appropriate key entered into a media player, personal computer or similar device to present or display the desired version. The information content may then be presented or displayed in the predetermined format or selected predetermined format in block 222. Accordingly, the information content data is formable and presentable in different versions of the information content for different audiences or intended recipients.

In block 224, a determination may be made if the information may have been updated and new information content data received or available for access or downloading. Under circumstances where a situation is being continuously monitored on a real-time basis, continual information updates may be available. If no updates have been received or are available, the method 200 may end at termination 226. If updates are being received or are available, the method 200 may return to block 216 where the formatting data may be decrypted and the process may continue as previously described with respect to blocks 216-224.

FIG. 3 is a block diagram of a system 300 for presentation integrity in accordance with another embodiment of the present invention. The system 300 may include an encrypter 302 to encrypt metadata or formatting data 304 associated with information content data 306. The encrypter 302 may also encrypt the information content data 306. The encrypter 302 may receive the information content data 306 and associated formatting data 304 from one or more data sources 308. The information content data 306 and associated formatting data 304 may each be encrypted in response to a key 310 that may be the same key or different keys. The key or keys 310 may be entered or applied to the encrypter 302 by an input device 312 that may be similar to the input device 112 of FIG. 1. The encrypter 302 may operate or run on a server 314 that may be a web or Internet type server, data processing device or a similar device. The encrypter 302 may be similar to the encrypter 102 of FIG. 1. The encrypter 302 may encrypt the information content data 306 into an encrypted markup language (ML) format or the like, such as extensible markup language (XML) and may encrypt the formatting data 304 into an encrypted style sheet transformation (SLT) format or the like, such as extensible style sheet transformation (XSLT).

An information broker 316 may receive and store or buffer the encrypted information content data (ICD) and the encrypted, associated formatting data (FD). The information broker 316 may then transmit the encrypted ICD and FD to a client 318 in response to the client 318 accessing a selected information page corresponding to a universal resource locator (URL) via a browser 320. The browser 320 may be any Internet or web type browser, such as, such as Netscape® Microsoft® Internet Explorer or the like. A user may be required to enter a valid password to access the page. The encrypted ICD and FD may be sent to the client 318 via a communication medium 322 that may be part of a communications network, such as the Internet or an intranet. The communication medium 322 may be similar to the communication medium 120 of FIG. 1.

The client 318 may be a personal computer (PC), data processing device or the like. The client 318 may include a formatter 324 to decrypt the information content data (ICD) 306, if encrypted, and the encrypted formatting data (FD) 304. In another embodiment, an element separate from the formatter 324 may be provided to perform the decryption function similar to decrypter 122 in FIG. 1. The formatter 324 may be similar to the formatter 130 described with respect to FIG. 1. The information content data 306 and associated formatting data 304 may be decrypted in response to a valid password 326. The password 326 may be the same as the key 310 or one of the keys used to encrypt the information content data 306 and associated formatting data 304 or may be different from the encrypting keys 310. The formatter 324 may send a password request 328 to the browser 320 and the browser 320 may respond with the password 326. The password 326 may be entered into the browser 320 by a user via an input device 330. The input device 330 may be similar to the input device 112 or 126 of FIG. 1.

The formatter 324 may apply the decrypted formatting data that may be in a SLT format to the information content data that may be in a ML format to convert or transform the information content data to a hypertext markup language (HTML) or the like. The HTML information content data may be in the predetermined format based on the decrypted SLT. The HTML information content data in the predetermined format may be transferred from the formatter 324 to the browser 320. The information content data 306 may be prevented from being presented by the browser 320 in a format other than the predetermined format because it is in HTML. At least one output device 332 may be coupled to the browser 320 to present the information content data 306 in the predetermined format. The output device or devices 332 may be similar to the output device or devices 132 of FIG. 1.

In another embodiment of the present invention, the formatter 324 may transform the information content data 306 that may be in a ML format into one of a plurality of predetermined formats that may be in HTML similar to that previously described. Each of the predetermined formats may correspond to a different password to select the predetermined format. The formatting data 304 that may be in a SLT format may be decrypted to provide the information content data in a selected one of the predetermined formats in HTML when the decrypted formatting data 304 is applied to the information content data 306 in a ML format. The predetermined format may be selected in response to entering the password corresponding to the selected predetermined format.

Figure 4A:
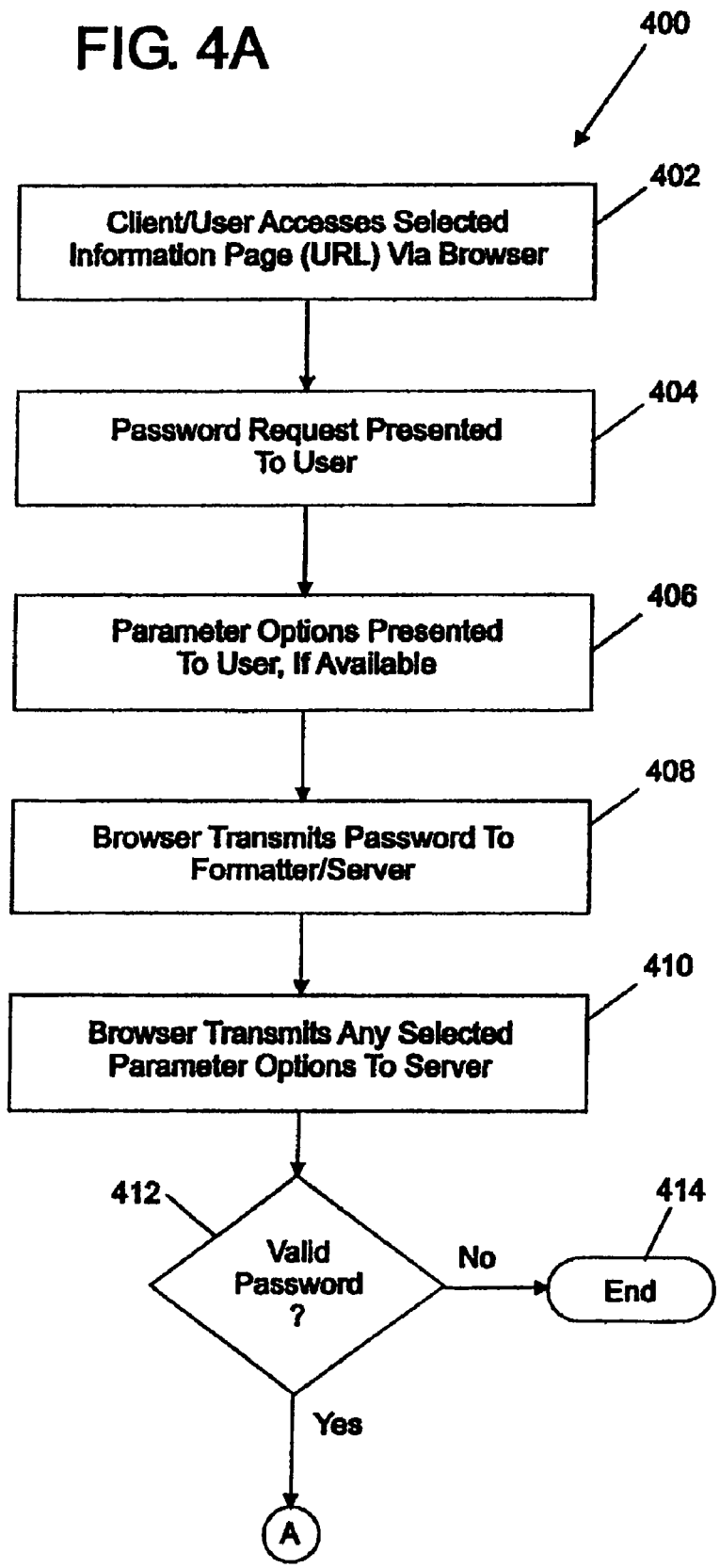

FIGS. 4A and 4B are a flow chart of a method 400 for presentation integrity of a page accessible via a browser, such as the browser 320 of FIG. 3, in accordance with an embodiment of the present invention. In block 402, a client or user may access a selected information page or web page by entering a URL corresponding to the page in the browser. The URL may be entered via an input device, such as input device 330 of FIG. 3 or the like. In block 404, a password request may be presented to the user on an output device, such as a monitor or display, in response to entering and transmitting the URL in block 402. The user may enter a valid password in a field on a password request page. The password request page or form may be formed using JavaScript or the like. A page or form containing fields to enter parameter options may also be presented to the user in block 406. The password page and parameter options page may be on the same page or screen shot. The parameter options fields may be buttons, check boxes, text fields or the like, that the user can activate or enter data using an input device, such as a mouse, keyboard or the like. In block 408, the browser may transmit the password to a server, such as server 314 in FIG. 3. The browser may also transmit the password to a formatter, similar to formatter 324 in FIG. 3, for use in decrypting encrypted formatting data and information content data, if encrypted. In block 410, the browser may transmit any selected parameter options to the server. In block 412, a determination may be made whether the password entered by the user is valid. If the password is invalid the method 400 may end at termination 414. If the password is valid, the selected page corresponding to the URL entered in block 402 may be sent from the server to the client in block 416. The selected page may be sent in an encrypted markup language (ML) or the like. In block 418, the formatting data for the selected page may be sent from the server to the client. The formatting data may be encrypted in a style sheet transformation (SLT) or the like. In block 420, the client or formatter of the client may decrypt the information content data for the selected page and decrypt the formatting data. The decrypted formatting data may be applied to the information content data embodying the selected page in the formatter to transform the information content data that may be in a ML format to HTML to present the selected page in a predetermined format based on the formatting data in SLT. The browser may receive the selected page in HTML in block 422. In block 424, the browser may present or display the selected page in the predetermined format based on the formatting data embodied in SLT and any selected parameter options selected by the user in block 406. The selected page may be presented to all users accessing the page with the valid password in the predetermined format because the formatting data is encrypted and can only be properly decrypted with the valid password. The decrypted formatting data may then be applied to the selected page to transform the page to HTML that cannot be altered by the default browser settings to present the page other than in the predetermined format.

In block 426, a determination may be made if the information content on the selected page has been updated or if update information is available. If no updates to the information content are available, the method 400 may end at termination 428. If the selected page has been updated, the method 400 may return to block 416 where the updated, selected page may be sent from the server to the client in an encrypted ML or the like. The method 400 may then proceed as previously described with respect to blocks 416-426.

Figure 5:
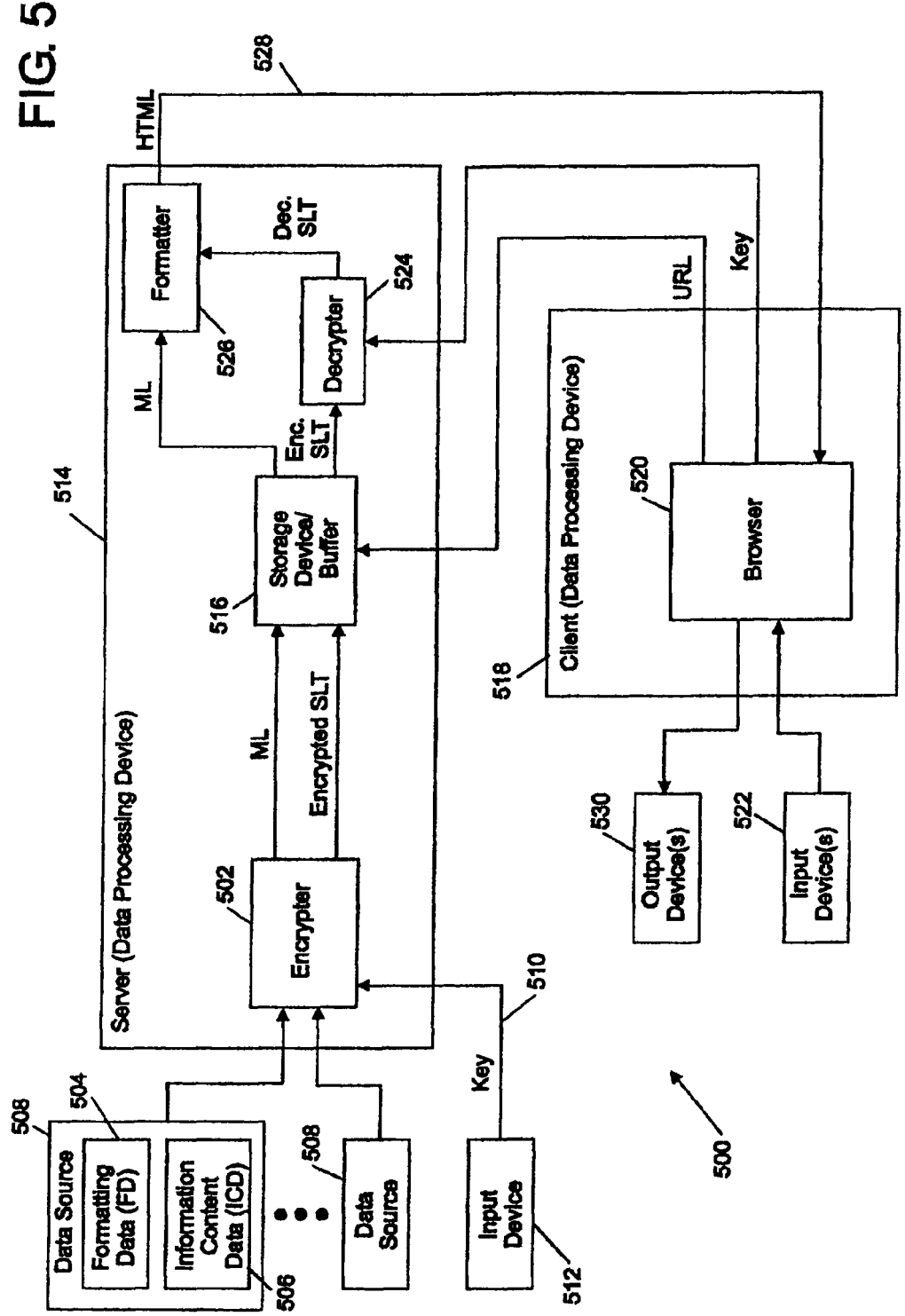
FIG. 5 is a block diagram of a system for presentation integrity in accordance with another advantageous embodiment of the present invention.

FIG. 5 is a block diagram of a system 500 for presentation integrity in accordance with another embodiment of the present invention. The system 500 is similar to the system 300 of FIG. 3 except the information page may be formed in HTML in the predetermined format in a server 514 and sent to a browser 520 in a client 518. The system 500 may include an encrypter 502 to receive information content data 506 and associated formatting data 504 from one or more data sources 508. The encrypter 502 may be similar to the encrypter 102 of FIG. 1. The encrypter 502 may encrypt the formatting data 504 into an encrypted SLT or the like in response to a key 510 entered via an input device 512. The information content 506 may also be encrypted into an encrypted ML or the like in response to a key entered via the input device 512. The formatting data 504 and information content data 506 may be encrypted by the same or different keys. The information content data 506 in ML or encrypted ML and the encrypted formatting data 504 in SLT may be stored in a storage device 516, buffer or the like. The information content data 506 may be associated with a URL or the like in the storage device 516. The information content data 506 may be accessed in response to a user entering the URL in the browser 520 and transmitting the URL to the server 514. The user may enter the URL using an input device 522. The input device 522 may be similar to the input device 112 of FIG. 1.

A decrypter 524 may decrypt the encrypted formatting data 504 in SLT from the storage device or buffer 516 in response to the information content corresponding to the URL being accessed or requested by the user or client 518. The SLT formatting data 504 may be decrypted in response to a valid key entered by the user into the browser 520 and transmitted to the decrypter 524. The decrypter 524 may also decrypt the information content data 506, if encrypted, in response to a key (not shown) entered by the user into the browser 520 and transmitted to the decrypter 524. The key to decrypt the information content 506 may be the same or a different key from the key used to decrypt the formatting data 504. The decrypter 524 may be similar to the decrypter 122 of FIG. 1.

A formatter 526 may receive the ML information content data 506 from the storage device 516 and the decrypted SLT formatting data 504 from the decrypter 524. The formatter 526 may transform the ML information content data 506 to an information page in HTML in the predetermined format by applying the SLT formatting data 504. The HTML information page may be sent to the browser 520 via a communication medium 528. The communication medium 528 may be similar to the communication medium 120 of FIG. 1. The browser 520 may be prevented from presenting the information page in other than the predetermined format because the information page is received by the browser 520 in HTML. The browser 520 may send the information page to an output device 530 to present or display the information page in the predetermined format. The output device 530 may be a display, printer or the like.

While only a single client 518 is shown in FIG. 5, multiple users or clients could access the information content 506 in the server 514 by entering the URL in their respective browsers. Because the browser for each client receives the information page in HTML, the information page will be presented in the same predetermined format by each browser. This may prevent any confusion or lack of coordination between different users that may need to coordinate with one another because all user will have the information page presented in the same predetermined format.

Figure 6:
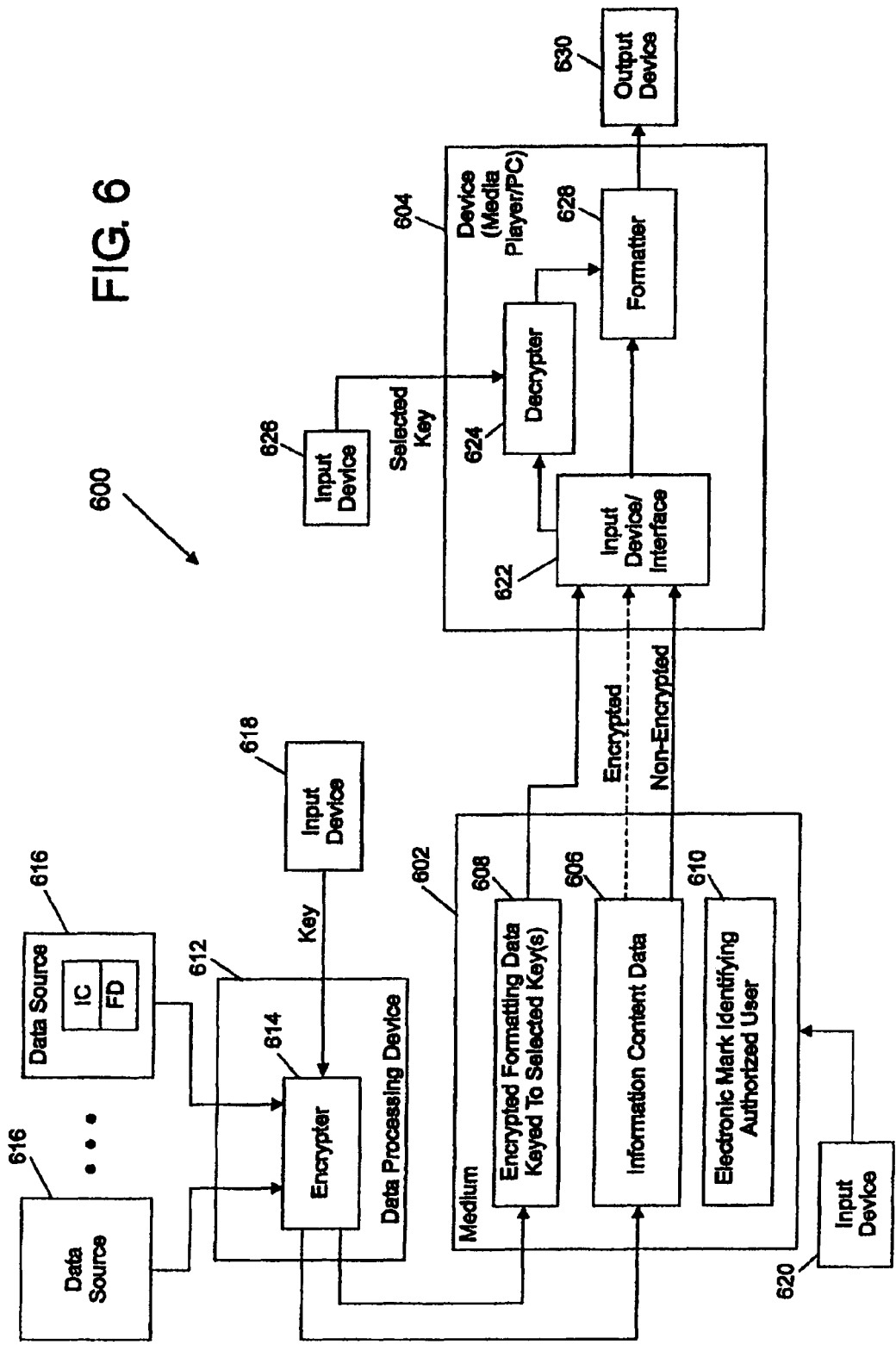
FIG. 6 is a block diagram of a medium and device to deter unauthorized access, use or copying of data structures embodied on the medium in accordance with a further advantageous embodiment of the present invention.

FIG. 6 is a block diagram of a system 600 and medium 602 to deter unauthorized access, use or copying of data structures embodied on the medium 602. The medium 602 may be a computer-usable or computer-readable medium having computer-usable or computer-readable program code embodied thereon for use by or in connection with the system 600 or a device 604. The device 604 may be a data processing device, media player, personal computer (PC), handheld computer, electronic game device or the like. The medium 602 may contain data structures embodied thereon that may include a particular copy of information content data 606, encrypted formatting data 608 associated with the information content data 606 and an electronic mark 610, label, indicator or the like identifying or corresponding to an authorized user of the particular copy of the information content data 606 on the medium 602. The information content data 606 and associated encrypted formatting data 608 may be loaded or stored on the medium 602 by a data processing device 612 that may include an encrypter 614 to encrypt at least the formatting data 608 and in some embodiments the information content data 606. The encrypter 614 may receive the information content data 606 and associated formatting data 608 from one or more data sources 616. The formatting data 608 for each copy of the information content data 606 stored on a medium, such as medium 602, may be encrypted by a unique or separate selected key. The key may be entered into the data processing device 612 to encrypt the formatting data 608 by an input device 618. The input device 618 may be similar to the input device 112 of FIG. 1. The information content data 606 may be encrypted by the same or a different key, if encrypted.

The electronic mark or label 610 to identify the authorized user of each copy of the information content data 606 and associated formatting data 608 may be loaded or stored on the medium 602 by another input device 620. The marking 610 may be formed by one of a public key signature, steganography, watermarking or the like. An unauthorized user of a particular copy of the information content data 606 may then be detected by comparing the electronic marking 610 on the copy identifying the authorized user to an identity of a user having the copy of the information content data 606 and encrypted formatting data 608 and the key assigned to the particular copy. If the identities are different the user may be unauthorized and may have a pirated copy of the information content.

In another embodiment of the present invention, the formatting data 608 may include data to format the information content data 606 into a plurality of different predetermined formats. Each predetermined format may provide a different version of the information content for a different audience or intended recipient. Each of the different predetermined formats may correspond to a different key to decrypt the formatting data 608. The same or a different key may be used to encrypt and decrypt to formatting data.

The device 604 may play, present, display or otherwise use the data structures embodied on the medium 602. The device 604 may include a first input device 622 or interface to receive, read, download or the like, the information content data 606 and associated, encrypted formatting data 608 on the medium 602. The first input device 622 may be an electronic, magnetic, optical, electromagnetic, infrared or semiconductor device, such as a disk drive, CD-ROM drive, DVD drive or the like. A decrypter 624 may decrypt the information content data 606, if encrypted, and the associated formatting data 608 received, read or downloaded by the first input device 622. The decrypter 624 may be embodied in software, hardware, firmware or the like. The information content data 606 and associated formatting data may be decrypted in response to a selected key corresponding to the particular copy of the information content data. The selected keys to decrypt the information content data 606 and associated formatting data 608 may each be the same or different and may be the same or different keys than those used to encrypt the information content data and formatting data. The selected key or keys may be entered by a second input device 626 that may be similar to the input device 112 or 126 of FIG. 1.

A formatter 628 may receive the decrypted information content data 606 and associated formatting data 608 from the decrypter 624. If the information content data 606 is not encrypted, the formatter 628 may receive the information content data 606 from the first input device 622. The formatter 628 may format the information content data in a predetermined format based on the decrypted formatting data. In another embodiment, the formatter 628 may format the information content into one of a plurality of formats, each format corresponding to a different key for decrypting the formatting data. The formatter 628 may be embodied in software, hardware, firmware or the like and may be similar to the formatter 130 described with respect to FIG. 1. An output device 630 may present the information content in the predetermined format or selected predetermined format from the formatter 628. The output device or devices 630 may be a display, sound system or speaker, printer or the like.

Examples for the medium 602 may be or form part of a communication channel, memory or similar devices. The medium 602 may be any medium that may contain, store, communicate or transport the data embodied thereon for use by or in connection with the device 604 or system 600. The medium 602 may, for example, be an electronic, magnetic, optical, electromagnetic, infrared or semiconductor system or the like. The medium may also be simply a stream of information being retrieved when the data is "downloaded" through a network such as the Internet.

Elements of the present invention may be embodied in hardware and/or software as a computer program code that may include firmware, resident software, microcode or the like. Additionally, elements of the invention may take the form of a computer program product on a computer-usable or computer-readable storage medium having computer-usable or computer-readable program code embodied in the medium for use by or in connection with a system, such as system 100 of FIG. 1, system 300 of FIG. 3, system 500 of FIG. 5, system 600 of FIG. 6 or the data processing devices or systems used in the systems 100, 300, 500 or 600. Examples of such a medium may be illustrated in FIG. 1 as input devices 112, 126, communication medium 120, data sources 108 or similar devices. A computer-usable or readable medium may be any medium that may contain, store, communicate or transport the program for use by or in connection with a system. The medium, for example, may be an electronic, magnetic, optical, electromagnetic, infrared or semiconductor system or the like. The medium may also be simply a stream of information being retrieved when the computer program product is "downloaded" through a network such as the Internet. The computer-usable or readable medium could also be paper or another suitable medium upon which the program may be printed.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method to deter unauthorized access, comprising:
   encrypting each copy of a data structure to be embodied on an electronically-readable medium;
   assigning a different key to decrypt the each copy of the data structure, wherein the data structure is decryptable only in response to the key assigned to the copy; and
   electronically identifying each copy of the data structure with an authorized user; and
   electronically marking each copy of the data structure to identify the authorized user by using one of a public key signature, steganography or watermarking to identify the authorized user;
   wherein the encrypted copy of a data structure comprises data to format information content data into a plurality of different predetermined formats, each predetermined format corresponding to a different version of the information content for a different recipient, and wherein the encrypted copy of data structure is decrypted to provide each of the different predetermined formats by a different key to present the corresponding different version of the information content.

2. The method of claim 1, further comprising detecting an unauthorized user by comparing the electronic marking identifying the authorized user to a user having the copy of the data structure and the key assigned to the copy.

3. The method of claim 1, wherein each copy of the data structure is encrypted by the same key assigned to decrypt the copy.

4. The method of claim 1, wherein each copy of the data structure is encrypted by a different key compared to the key assigned to decrypt the copy.

5. A method to deter unauthorized access, comprising:
   encrypting formatting data associated with information content data;
   providing the encrypted formatting data with each copy of the information content data embodied on an electronically-readable medium; and
   assigning a different key to decrypt the formatting data of each copy of the information content data, wherein the formatting data of each copy of the information content data is decryptable only in response to the key assigned to the copy;

wherein the encrypted formatting data comprises data to format the information content data into a plurality of different predetermined formats, each predetermined format corresponding to a different version of the information content for a different recipient, and wherein the encrypted formatting data is decrypted to provide each of the different predetermined formats by a different key to present the corresponding different version of the information content.

6. The method of claim 5, further comprising identifying each copy of the information content data and the formatting data with an authorized user.

7. The method of claim 6, further comprising electronically marking each copy of the information content data and the encrypted formatting data to identify the authorized user.

8. The method of claim 7, further comprising detecting an unauthorized user by comparing the electronic marking identifying the authorized user to a user having the copy of the information content data and encrypted formatting data and the key assigned to the copy.

9. The method of claim 6, further comprising electronically marking each copy of the information content data and the encrypted formatting data using one of a public key signature, steganography and watermarking to identify the authorized user.

10. The method of claim 5, further comprising encrypting the information content data.

11. The method of claim 10, wherein the formatting data and the information content data are each decryptable by the key assigned to the copy.

12. The method of claim 10, wherein the information content data and the formatting data are each decryptable in response to different keys.

13. The method of claim 10, wherein the information content data and the formatting data are encryptable in response to different keys and are decryptable in response to keys that are each different form the keys used to respectively encrypt the information content data and formatting data.

14. The method of claim 5, further comprising presenting the information content data as one of an audio, visual, or combination audio-visual work in response to the key assigned to the copy.

15. The method of claim 5, wherein the information content data is a software program and wherein the method further comprises authorizing use of the software program in response to the key assigned to the copy of the information content data.

16. A system to deter unauthorized access, comprising:
a processor;
an encrypter executed by the processor to encrypt formatting data associated with information content data, wherein the encrypted formatting data is provided with each copy of the information content data embodied on an electronically-readable storage medium; and a different key to decrypt the formatting data assigned to each copy of the information content data, wherein the formatting data of each copy of the information content data is decryptable only in response to the key assigned to the copy when the electronically-readable storage medium is inserted in a device for presenting the information content data, wherein the encrypted formatting data comprises data to format the information content data into a plurality of different predetermined formats, each predetermined format corresponding to a different version of the information content for a different recipient, and wherein the encrypted formatting data is decrypted to provide each of the different predetermined formats by a different key to present the corresponding different version of the information content.

17. The system of claim 16, wherein each electronically-readable storage medium comprises an electronic mark to identify an authorized user of the information content embodied on the electronically-readable storage medium.

18. The system of claim 17, wherein the electronic mark is one of a public key signature, a steganographic mark, and a watermark.

19. The system of claim 17, wherein an unauthorized user of the information content is identified by comparing the electronic mark to an identity of the user in possession of the information content data.

20. A computer program product comprising a non-transitory computer-readable storage medium having computer usable program code embodied therewith to deter unauthorized access, the computer-readable storage medium comprising:
computer usable program code configured to encrypt formatting data associated with information content data;
computer usable program code configured to provide the encrypted formatting data with each copy of the information content data embodied on an electronically-readable medium; and
computer usable program code configured to assign a different key to decrypt the formatting data of each copy of the information content data, wherein the formatting data of each copy of the information content data is decryptable only in response to the key assigned to the copy, wherein the encrypted formatting data comprises data to format the information content data into a plurality of different predetermined formats, each predetermined format corresponding to a different version of the information content for a different recipient, and wherein the encrypted formatting data is decrypted to provide each of the different predetermined formats by a different key to present the corresponding different version of the information content.

21. The computer program product of claim 20, further comprising computer usable program code configured to electronically mark each copy of the information content data and the encrypted formatting data to identify an authorized user.

* * * * *